(12) United States Patent
Prokoski et al.

(10) Patent No.: US 6,850,147 B2
(45) Date of Patent: Feb. 1, 2005

(54) PERSONAL BIOMETRIC KEY

(75) Inventors: Francine J. Prokoski, Fairfax, VA (US); Veronica Mikos Prokoski, Fairfax, VA (US)

(73) Assignee: Mikos, Ltd., Fairfax, VA (US)

( * ) Notice: Subject to any disclaimer, the term of this patent is extended or adjusted under 35 U.S.C. 154(b) by 193 days.

(21) Appl. No.: 10/109,677

(22) Filed: Apr. 1, 2002

(65) Prior Publication Data

US 2002/0140542 A1 Oct. 3, 2002

Related U.S. Application Data

(60) Provisional application No. 60/280,498, filed on Apr. 2, 2001.

(51) Int. Cl.$^7$ .............................. G06F 7/04; G06K 9/00
(52) U.S. Cl. ................. 340/5.53; 340/5.52; 340/5.82; 340/5.83; 382/115; 382/117; 382/118
(58) Field of Search .................... 340/5.53, 5.8, 340/5.81, 5.82, 5.83, 5.84, 5.75, 5.52; 382/115, 118, 117; 380/258

(56) References Cited

U.S. PATENT DOCUMENTS

| | | | |
|---|---|---|---|
| 5,163,094 A | | 11/1992 | Prokoski et al. |
| 5,719,950 A | * | 2/1998 | Osten et al. ............... 340/5.82 |
| 6,038,666 A | * | 3/2000 | Hsu et al. ................... 380/285 |
| 6,104,922 A | * | 8/2000 | Baumann .................... 455/410 |
| 6,173,068 B1 | | 1/2001 | Prokoski |
| 6,532,298 B1 | * | 3/2003 | Cambier et al. ........... 340/5.82 |
| 6,657,538 B1 | * | 12/2003 | Ritter ........................ 340/5.82 |
| 2002/0053857 A1 | * | 5/2002 | Scott et al. ................. 310/314 |
| 2003/0210131 A1 | * | 11/2003 | Fitzgibbon et al. ........ 340/5.53 |

\* cited by examiner

*Primary Examiner*—Brian Zimmerman
*Assistant Examiner*—Clara Yang
(74) *Attorney, Agent, or Firm*—Whitham, Curtis & Christofferson, P.C.

(57) ABSTRACT

A personal biometric key system uses a personal identity code transmitted to a universal biometric electronic lock via a communication system and using a clock or GPS chip and allows a person to select one or more personal biometric methods and to be personally responsible for the maintenance of the sensor and its availability. The selection can be tailored to the particular needs and circumstances of the person using the key. The person can also change the personal biometric sensor when needs and circumstances change. The organization being accessed by the key can set minimum levels for what type sensor data they will accept and for level of services they will provide for a given type sensor.

20 Claims, 6 Drawing Sheets

PERSONAL BIOMETRIC KEY

This patent application claims priority from U.S. provisional application No. 60/280,498 having the same title as the present invention and filed on Apr. 2, 2001.

The present application is related to issued patents and pending patent applications of the inventor. In particular, the use of thermal infrared imaging as a biometric sensor is taught in U.S. Pat. No. 5,163,094 to F. J. Prokoski et al. and U.S. Pat. No. 6,173,068 to F. J. Prokoski. The use of thermal infrared imaging for condition monitoring is taught in pending U.S. patent application Ser. No. 10/097,623 to F. J. Prokoski for METHOD AND APPARATUS FOR OPERATOR CONDITION MONITORING AND ASSESSMENT filed on Mar. 15, 2002. The teachings of these prior patents and applications are incorporated by reference as part of the technical disclosure of the present application.

BACKGROUND OF THE INVENTION

1. Field of the Invention

The present invention generally relates to identification systems used for security, and more particularly to use of biometric devices carried by individuals.

2. Background Description

Wireless communications is the fastest growing technology in history. More than one billion people worldwide now use wireless communications, including cell phones, personal digital assistants, and laptop computers. Wireless users of the internet now exceed the number of wireline users. Internet access via cell phone and PDA is growing almost as fast, with users performing all the informational and financial transitions from their wireless devices that they formerly performed on their desktop computer. As a subset of that market, the number of Bluetooth compliant devices is skyrocketing. At the same time, there is an urgent need, and a tremendous market, for security provisions which will assure that the devices are used only by authorized persons. Various companies have developed methods to provide digital signatures, computer security, access control, and biometrics to prevent identity theft, assure the identity of persons performing financial transactions, and replace the use of passwords while providing better security for wireless devices.

Biometrics methods currently use one or more sensors installed and dedicated to a particular control point. Upgrading or repairing the sensors may affect the accuracy of the identifications at that location in the future. A given sensor technique may not work for all persons who are authorized for access. These aspects have kept biometrics expensive to buy, install, and maintain, and confusing for many segments of the population. They have not fully exploited the potential security of biometrics. Most current biometric systems achieve at best about 7% error. Using multiple biometric techniques can improve that figure, but at increased cost and inconvenience to the supplier and user.

Biometric security as currently deployed has limitations which to only a limited extent can be overcome by using multiple sensors. In particular:

1) The commonly-used biometric techniques such as fingerprints, face recognition, hand geometry, voice recognition, and retina/iris scanning do not give reliable results for all persons. People who are elderly, artisans, have dry skin, or are from certain ethnic classes such as Asians and Ethiopians often do not produce useable fingerprints. In the general population of airports, for example, more than 8% of passengers are not good candidates for fingerprint-based identification. Hand geometry is not sufficiently unique to be useful with large databases. Face recognition is far less accurate for dark skinned persons; especially in dim light. Voice recognition is unreliable with elderly persons, those under stress or tired, or persons with colds or dry throats. Retina and iris scanning may be unreliable for persons with cataracts or glaucoma, or those wearing colored contact lenses, or people taking certain drugs or drinking alcohol.

2) Deployed biometric sensors are commonly vulnerable to vandalism, sabotage, degraded performance associated with the need for frequent maintenance, and undetected operational failures. Fingerprint sensors require clean glass plates for proper identification. The need for finger contact with those plates presents a problem. Oils from the hand accumulate and reduce the effectiveness of the system unless the plates are routinely cleaned. Dust and other debris from the hands, and intentional destruction or marking on the plate are also potential error sources which can deny use of the sensor if detected, or render the sensor performance unreliable if not detected. Hand geometry also suffers from the need for contact between the hand and the sensor. Retinal and iris scanners don't require direct contact but do require close proximity to the users, putting them within range for simple vandalism or sabotage. Voice recognition and facial recognition allow more distance between subject and sensor, and allowing the sensor's exact position to be hidden; reducing the potential for simple vandalism or sabotage. Persons who are opposed to the use of biometrics may intentionally vandalize installed systems or sabotage their use. Especially in the case of unattended systems, where biometric systems replace human guards, the resulting damage can destroy the potential cost and security advantages of using biometric technologies.

3) Use of different types of sensors at various locations requires training of the users for each different device. Poor training, or poorly designed biometric systems, result in low throughput. Unless the subject is a frequent user of that type of sensor, he may experience frustration, delays, and false rejections through improper use. Some systems incorporate features to detect or prevent piggybacking. Some incorporate timeouts which require response within a certain time period or the system automatically rejects the subject. Some must be cued by a PIN or ID card. Some allow multiple attempts and other do not. Having to remember the operational details for each biometric sensor location may be more cumbersome than remembering different passwords for each location—which is often the impetus for installing biometrics.

4) Different persons have different levels of concern for security, require various levels of access to secured areas and information, and have various levels of tolerance for dealing with security devices and procedures. A young student may only need to access his own checking account or his own credit card account which both have small balances. A senior government official may need secure access to classified locations and computer networks, in addition to the ability to perform remote financial transactions involving his personal stocks and bank accounts. An elderly retired person may need only to obtain cash from an ATM or purchase items using a debit or credit card. However, he may have very poor eyesight and limited mobility and so be unable to understand or use new sensors installed at different locations.

5) Biometric identity theft can eliminate the protection seemingly afforded by the use of biometric security. Persons leave a trail of their fingerprints everywhere they go. Others can obtain those prints and manufacture a tool for forging the prints, or sever the finger. Visual face images can be collected without the subject's knowledge, and can be used to disguise another person, or to produce a face mask which sufficiently replicates the subject that it can fool a face recognition system. Iris scans can also be collected without the subject's knowledge, and can be used to fashion a contact lens which mimics the subject's.

6) Biometric security needs to be extended to wireless and portable devices which are increasingly being used by military, law enforcement, and civilian users for transmissions of information and control signals which require privacy and protection. This includes the use of the wireless internet for financial transactions and transmission of sensitive data, and also the remote controlling of sensors and devices. Both sending and receiving parties need to be identified. Portable, personal biometric sensors will be needed for use in aware spaces, which automatically and continually identify and track inhabitants, providing them information, tools, access, and other services seamlessly without requiring the individual separately log on to each.

7) In many applications, the condition of the subject is also of concern in addition to his identity; particularly whether he is alive, awake, alert, attentive, able to perform, being deceptive, or suffering from medical or other trauma. Current biometric systems often provide degraded performance when the subject's condition changes, but do not adapt to those changes nor provide information about them. It is not sufficient that an emergency response worker be identified before he enters a HazMat environment; it is also essential that he be confirmed to be able to perform. Similarly, the person driving a commercial truck needs to be confirmed to be awake and sober, in addition to verifying his identity.

The examples below are representative of many similar patents and disclosures which are references to the current disclosure.

In U.S. Pat. No. 6,335,688, Method and system for airport security, Sweatte presents a method and system for airport or other building security where passengers or persons entering a building approach a check-in point or check-in counter and must undergo a positive identification (ID) by fingerprint scan, retinal scan, or an other means of positive identification. A digital photograph can then be taken of the person. This data plus the positive ID data and optional data about the person including a scan of a government supplied ID like a drivers license or passport is entered in a database and checked against various law enforcement databases such as FBI or others for law enforcement interest in the person. The person is then issued a smartcard with wireless capability which he is to carry while in the facility. The system can track his location by means of the smartcard, assuming that he carries it. The communication features of the smartcard are only used for tracking the card's location; there is no described use as a key to biometrically-secure locations or systems. There is also no described use at other facilities; in fact the invention is specifically for a single use at a single facility. In addition, no biometric sensor is embedded in the smartcard, which is merely an RFID sensor broadcasting a code which references a file in the facility database.

In U.S. Pat. No. 6,175,922 for electronic transaction systems and methods therefore, Wang presents a method and apparatus for approving a transaction request between an electronic transaction system and a portable electronic authorization device (PEAD) carried by a user using an electronic service authorization token. Advantages of the invention include the ability to securely and conveniently perform transactions with a portable device. The PEAD shares some characteristics with the Personal Biometric Key (PBK) of the current invention. However, under Wang, authorization and approval occur entirely within the PEAD. The user identification data that is employed to authenticate transactions may be biometric information; however, it is stored as a data block the same as if the identification data were merely the name and social security number. Wang gives no special weight to the use of biometrics, and does not include a biometric sensor within the PEAD. Furthermore, authorization decisions in his system are made within the PEAD. The PEAD may include a GPS system, but it is used to "search automatically the closest Point-of-Sale terminal according to GPS geometry position and establish the link automatically by using a Location-ID mapping table that maps the proximity of the point of sale terminal location to the unique ID of the point of sale terminal". The GPS is not used for security in the PEAD.

Subsequent to the priority date of the present invention, in August 2001, AuthenTec Inc. announced the TruePrint™ fingerprint reader with incorporated Bluetooth transmitter, based upon the IFKey fingerprint key. IFKey Co., Ltd., headquartered in Seoul, Korea, is a biometrics security provider specializing in wireless fingerprint authentication technology, and owned by Samsung Data System (SDS), Korea's largest systems integration company. AuthenTec's press releases claim the company has 17 pending patents, but does not state the countries in which they are pending. Although its product literature echoes many of the features originally specified for the PBK of this invention, certain key differences persist.

AuthenTec uses only fingerprint sensors and makes no provision for use of other sensors, does not include a GPS or clock circuit to change the personal biometric code with each transmission and record date, time and location of each use, does not insure the immediate proximity of user to lock, does not provide for continuous or intermittent re-verification of identity, and provides no provision for checking the condition of the user.

In summary, the prior art is lacking in the following particulars: 1) The commonly-used biometric techniques such as fingerprints, face recognition, hand geometry, voice recognition, and retina/iris scanning do not give reliable results for all persons. 2) Deployed biometric sensors are vulnerable to vandalism, sabotage, degraded performance associated with the need for frequent maintenance, and undetected operational failures. 3) Use of different sensors for requirements at various locations requires training of the users for each different device. 4) Different persons have different levels of concern for security, require various levels of access to secured areas and information, and have various levels of tolerance for dealing with security devices and procedures. 5) Biometric identity theft can eliminate the protection seemingly afforded by the use of biometric security. 6) Biometric security needs to be extended to wireless and portable devices which are increasingly being used by military, law enforcement, and civilian users for transmissions of information and control signals which requires protection. 7) In many applications, the condition of the subject is also of concern in addition to his identity; particularly whether he is alive, awake, alert, attentive, able to perform, being deceptive, or suffering from medical or other trauma.

SUMMARY OF THE INVENTION

It is therefore an object of the present invention to provide a system for a personal biometric key that gives reliable results for all persons.

Another object of the invention is to overcome vulnerability of biometric sensors to vandalism, sabotage, degraded performance associated with the need for frequent maintenance, and undetected operational failures.

A further object of the invention is to provide a personal biometric key that is usable at different locations and does not require training of the user for use at each different location.

It is also an object of the invention to provide a personal biometric key that can be tailored to users who have different levels of concern for security, require various levels of access to secured areas and information, and have various levels of tolerance for dealing with security devices and procedures.

Another object of the invention is to protect against identity theft of the personal biometric data.

A further object of the invention is to extend biometric security to wireless and portable devices.

It is yet another object of the invention to provide a personal biometric key which is responsive to the condition of the user.

An object of the invention is also to provide for authorization decisions to be made not by the personal biometric key device but by a biometric lock at the portal being accessed.

Yet a further object of the invention is to provide for a determination that the user is in immediate proximity to the lock.

In accordance with the Personal Biometric Key (PBK) of the present invention the user selects a biometric sensor which provides his desired level of accuracy, reliability, convenience, security, and cost effectiveness when used by him. He assumes the responsibility for its maintenance, repair and replacement. He learns to use it effectively, and can upgrade or change it as desired. The PBK transmits his personal identity code to any device incorporating a compatible biometric lock, thereby facilitating rapid and low-cost expansion of biometric controls for both fixed and mobile installations. The personal identity code transmitted changes with each transmission through use of a clock or GPS (Global Positioning Satellite) chip. The preferred embodiment uses Bluetooth as the communications protocol. Coupled with the personal choice of biometric sensor, the one-time-code use reduces the chance of biometric identity theft from interception of the communications. The preferred embodiment use of infrared identification as the biometric technique eliminates the possibility of biometric identity theft through the combined capture of the PBK and discovery of the user's biometric signature. The use of an infrared imager as the biometric sensor also has the advantage of allowing any portion of the body to be used for identification; the area imaged need not be the face. This adds further protection against biometric identity theft, since an adversary would not know what area of the subject's body was used to enroll.

The preferred embodiment uses a dual-band infrared and visual imager as the biometric sensor which is incorporated into a personal digital assistant (PDA) and/or cellular phone. The infrared band is used for identification and condition monitoring of the user. It assures that the subject is present and alive at the time of the identifying transmission, and can support further condition assessment. The visual band is used to enhance the identification capability and to support videoconferencing capability. A GPS chip provides date/time/location information. Bluetooth communications between the PBK and biometric lock utilizes the handshaking features of Bluetooth along with the GPS code to ensure that the PBK is physically near the biometric lock. This ensures that the subject is alive and in the location of the biometric lock at the time of transmission.

In one implementation of the invention, the personal biometric key for a user comprises a biometric sensor selectable and maintainable by the user, a GPS receiver which serves as a source of a unique output code, a personal biometric code produced from the biometric sensor, a composite code produced from the biometric code and the unique output code, a transmitter which broadcasts the composite code to a compatible receiver, the receiver having a universal biometric lock to which the user has enrolled for access to a portal, and where the unique output code is different for each broadcast and the universal biometric lock uses the composite code to confirm access of the enrolled user to the portal.

Current security methods generally put a biometric sensor, or collection of sensors, at each device or portal to be controlled. This invention, however, relies on the use of a personal, portable biometric sensor integrated with a short-distance communications transmitter such as a Bluetooth radio, which a person can carry and use to unlock or access any device which has a compatible receiver. The choice of sensor is made by the user. Features are incorporated into the design which cause the user's transmitted biometric code to change with each use so that transmissions cannot be decoded for use by an unauthorized person.

There are many advantages to this approach, which is analogous to the case of the king who wanted to wander everywhere in his kingdom and never stub his toe. Some people decided that the whole kingdom must be carpeted. Other people said the king should just wear slippers. The PBK is the slippers approach. When biometrics is used for cooperative identification, the subject is motivated to cooperate. Unless he does so, he will not get access, information, money, credit, medical care, etc. By providing him with his own biometric sensor, he can make his personal tradeoff between cost and reliability. And he is motivated to keep it in good shape and learn to use it well. Also, that means that the same sensor is used repeatedly at all different locations, rather than various sensors. The result is better repeatability and more accurate identification for the user with fewer false negatives. He can essentially buy the level of accuracy he wants to have.

An additional concern is that a given biometric technique may not work for everyone. For example, fingerprints of good quality for automated identification are not produced by all persons. In particular, the elderly, persons with thin skin or very dry skin, Asians, artisans who work with various materials, and ethnic groups, such as Ethiopians, who have very narrow fingers may not be reliably identified with current fingerprint scanners.

As another example, very dark-skinned persons are often not accurately identified by facial recognition systems which use visible light imaging. Persons who wear eyeglasses may not be accurately identified by facial recognition systems which use infrared imaging sensors. Persons who wear colored contact lenses, or who have cataracts may not be accurately recognized by iris scanning systems. Persons who travel by air or use their voices extensively may not be accurately identified by voice recognition systems. The proposed system provides each person with the chance to select which biometric method he will use to present his identity.

From the standpoint of the entity providing biometrically-secured access to facilities or systems or information, they save the cost of selecting one or more biometric sensors which may not be effective for the whole user population, training and enrolling the users, putting biometric sensors at each access point, maintaining them, upgrading them as newer technologies become available, and balancing the performance of a network of sensors, each of which has slightly different sensitivity. Instead, they need to only incorporate a universal biometric electronic lock, and allow users to enroll with their own keys. This approach will make biometric security available to massive markets, including home front doors, file cabinets, liquor cabinets, vehicles, computers, point of sale terminals, gas station pumps; virtually anywhere individuals currently use keys or credit cards or passwords.

The biometric sensor can be any type compact enough to fit into a hand-held configuration. The resulting PBK can have the form factor of a thick credit card or keyring fob, or that of a PDA (personal digital assistant) or cell phone. The preferred embodiment uses a dual band IR-visual camera as the biometric sensor and integrates it into a PDA/cell phone combination. That provides biometric security to control use of the PDA/cell phone, generates the PBK code for remote access to other devices, and also provides the much-desired videophone and digital image transmissions capabilities sought by current users of the wireless internet.

The method and apparatus of this invention provides the basis to develop a product line of personal biometric keys to meet current and forecasted requirements for biometrically secure:

access to physical locations and computer networks, access to ATMs and point of sales terminals;

PKI, digital signature, and smart card requirements of the federal government.

The next generation of cell phones and PDAs will incorporate miniature video cameras to transmit facial imagery of the user and general imagery as could be obtained from a digital camera. Applications include video email, videoconferencing, design collaboration, incident and status reporting, and security. Installing a dualband IR-visual imaging capability would offer significant advantages. First, it will provide a positive biometrically secure ID and digital signature for all transactions regardless of lighting conditions. Second, it offers enhanced compression of talking head video images, providing better transmission and reconstruction fidelity of facial expressions and speech-related movements. Third, it can deny activation and use to anyone other than an authorized user, except for prerecorded emergency transmissions. Federal government and industrial users of PDAs and cell phones are increasingly concerned about the security of information downloaded by wireless devices, and about financial transactions performed using the devices. Especially in the case where multiple persons share the use of a wireless device, or where its loss is possible, automatic positive ID of the user, and tagging his digital signature onto each transaction, reduces or removes the security risk. The PBK itself maintains a transaction log indicating the date/time/location of its use which has a myriad of applications.

Furthermore, the present invention provides personal choice of sensor and protection against personal identity theft through communications intercept, features which are missing from the publically disclosed products of the AuthenTec products referenced in the Background section of this disclosure. The significant advantages and novelty of the preferred embodiment of the applicants' invention have no precedent in the IFKey technology disclosed in the AuthenTec product. In particular, the use of a dualband infrared-visual imager as a biometric identification and condition monitoring sensor and as a generalized remote imaging device is not disclosed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

While other inventions address the use of various and multiple biometric sensors, and other inventions address the use of a portable RF device for transmitting a private code, no previous invention presents the points of novelty of the current invention. The proposed method and apparatus allows a person to select one or more personal biometric methods and to be personally responsible for the maintenance of the sensor and its availability when and where he wishes to use it. He can select a technique which offers very high accuracy and convenience with an expected high level of security, for which he pays more. Alternately, he can select a very simple method which offers less uniqueness and perhaps requires a longer identification time, but which is cheaper.

The person can also change his personal biometric sensor when he wishes to do so. For example, when a person graduates from school and gets a job, he may need and be able to afford an upgraded system. He would submit his new biometric sensor signature just as he would provide a new handwritten signature to a bank when he wished to change his account or open a new one. This provides a method for maintaining the high security that biometrics provides, tailored for each individual, and under that person's control.

The organization being accessed can set minimum levels for what type sensor data they will accept and for level of services they will provide for a given type sensor. For example, a bank may allow use of a fingerprint-based PBK to get up to $300 from an ATM. However, it may require dual-band facial identification to withdraw more than $10,000.

The use of incorporated GPS data into the transmitted signal, in addition to the device code and log code, insures that there is never a repetition of transmission of the biometric code in the clear. Therefore, it is not possible to intercept the output signal of the PBK, and from that obtain a person's biometric code. The GPS also ensures that the user is in immediate proximity to the biometric lock, which prohibits an adversary forcing a PBK user to activate access from a remote location.

The PBK provides a digital signature for use in any legal transaction. It also simultaneously produces authentication information as to the date and time and location of the transaction.

Other features of the PBK System:

The Personal, Portable Biometric Key system provides biometric security to any location, device, system, or service that can be controlled by an electronic lock or other device which incorporates a suitable receiver PBK systems facilitate use of cheap Bluetooth Receivers at large number of installations: (door locks, safes, computers, cell phones, PDAs, laptops, mailboxes, vehicles, weapons, etc.) to provide biometric security at minimal cost.

Prevent Use by Unauthorized Persons of PDAs, cell phones, and other devices in which the PBK is installed Allow users to select from different sensors offering Variable Levels of Security Authenticate User and Key on each Transaction or Transmission Generate and tag transmissions or openings with Legally-Accepted Digital Signature Can Also Encode Date/Time/Location and Key Odometer with Digital Signature The preferred embodiment uses a dual-band visual and infrared camera installed in a combination cellphone/Personal digital assistant. This system has the following advantages The dual-band face recognition biometric provides a Unique signature for each user Since the sensor is non-contact and passive, it can provide Continuous verification of user's identity as he performs extended tasks or make multiple transactions The sensor can also provide Continuous Monitoring of the user's condition, including whether he is alive, awake, alert, attentive, able to perform, under stress or anxious, experiencing any medical or other trauma, inebriated or under the influence of drugs By mounting the sensor on a headset or earpiece, the PBK can be hands-free and completely non-intrusive. This is particularly advantageous in aware spaces to provide seamless transition from one activity to another or from one area to another without the need to be re-identified.

Dual-band face recognition works for 100% of population, and under any lighting conditions including total darkness, making it the preferred default biometric sensor.

The same dual-band camera supports videoconferencing, videophone, video email, and transmission of digital images directly to on-line databases, with the same date/time/location tag. The PBK thereby serves as a biometrically secure digital assistant in documenting legal transactions transmitted over the internet, phone system, personal exchanges, or stored in a database.

Users can transmit their personal biometric codes to a central repository, which can provide authentication services to third parties. Also, the PBK can be used to sign transmissions to the central authority which will store and authenticate the date and time and location or receipt as well as the personal biometric ID of the sender. This can provide links into PKI and other encryption techniques. It also provides legal proof of such events as: tax filings, wills and trust, contracts, living wills, power of attorney, changes to existing will etc., change in beneficiaries on life insurance policies, bids and proposals at auction or on competitive procurements.

The Central Authority can also serve as a clearing house when a person loses his personal biometric key. He would notify the CA, which would transmit or maintain that information for all participating systems.

The PBK implementation can be combined with the Evidentiary Imaging System of pending U.S. patent application Ser. No. 09/778,967 to F. J. Prokoski filed on Feb. 7, 2001 to tag each frame of imagery with the biometric identity code of the user.

Figure 1:
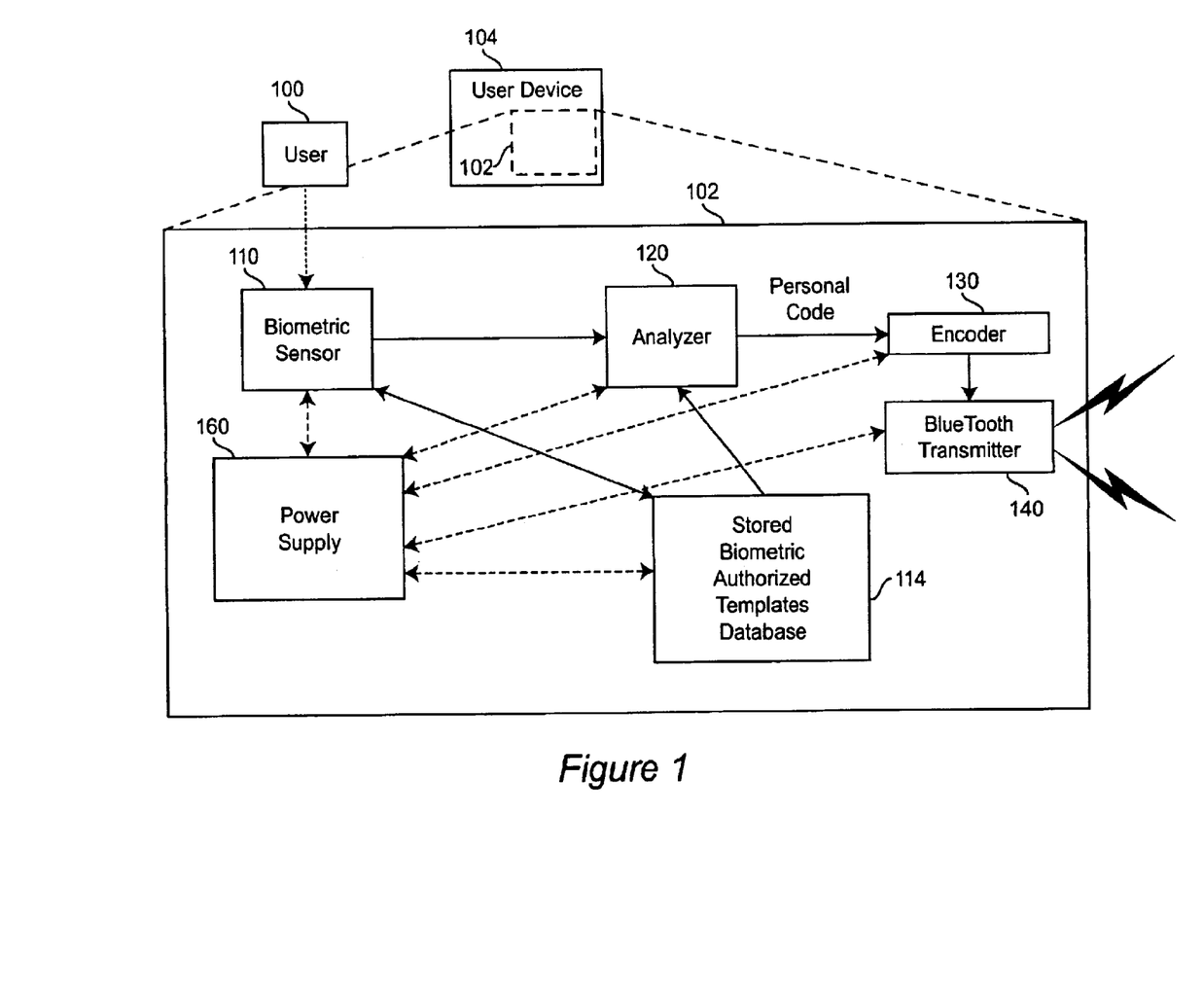
FIG. 1 is a block diagram illustrating the personal biometric key transmission subsystem with the preferred embodiment use of a Bluetooth transmitter for communications.

FIG. 1 illustrates the personal biometric key transmission subsystem 102 with the preferred embodiment use of a Bluetooth transmitter for communications. The user 100 presumably carries a user device 104 (e.g. a PDA or cell phone) within which is embedded the PBK transmission subsystem 102. He provides his appropriate anatomical feature to the biometric sensor 110 which extracts biometric features and stores them in database 114. This is performed initially as an enrollment operation and later for each intended use. The output of the biometric sensor 110 and the database 114 is analyzed at 120. A personal code corresponding to the user is output to the encoder 130 which puts it into proper format for transmission by the Bluetooth transmitter 140. Each of the modules is powered by an internal power supply 160.

Figure 2:
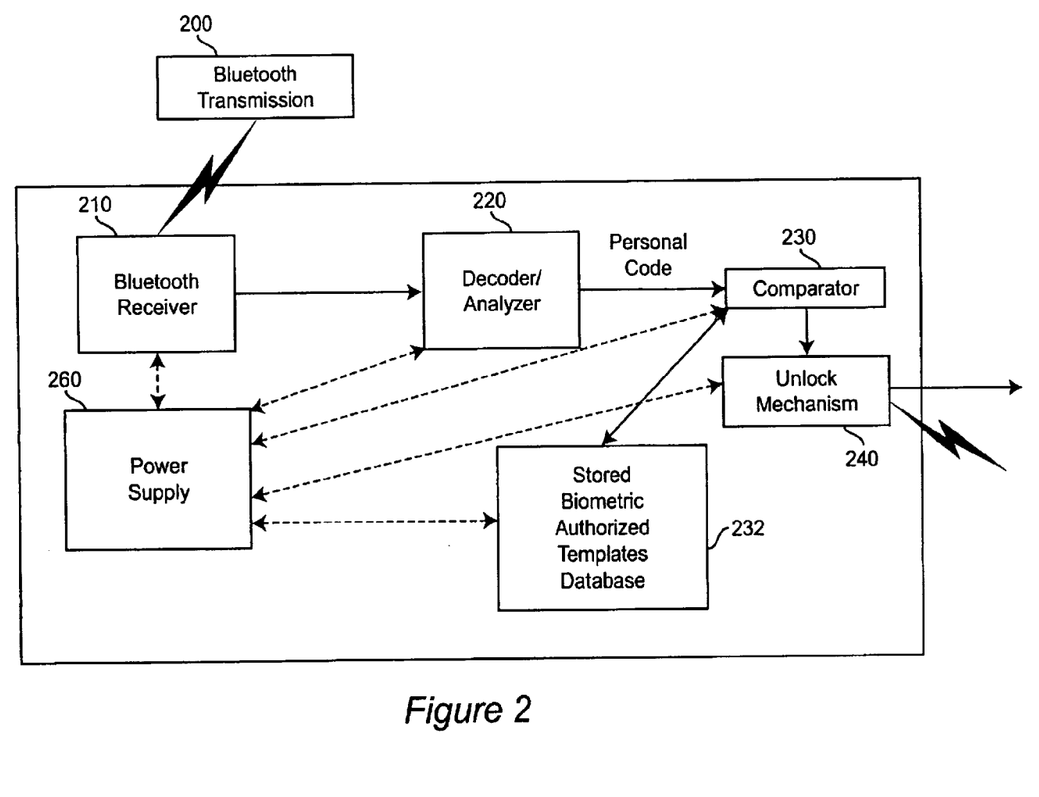
FIG. 2 is a block diagram illustrating the personal biometric key receiver subsystem with the preferred use of a Bluetooth receiver for communications.

FIG. 2 illustrates the personal biometric key receiver subsystem with the preferred use of a Bluetooth receiver for communications. The transmission from FIG. 1 is shown at 200. It is received by the Bluetooth receiver 210 and decoded and analyzed at 220 to extract a personal biometric code which is sent to the comparator 230. The comparator 230 references the database 232 and sends a signal to the unlock mechanism 240 to either unlock or not unlock the controlled mechanism, depending on the results from the comparator 230. The control signal for unlocking can be wireline, RF, or other communications such as telephone signal.

Figure 3:
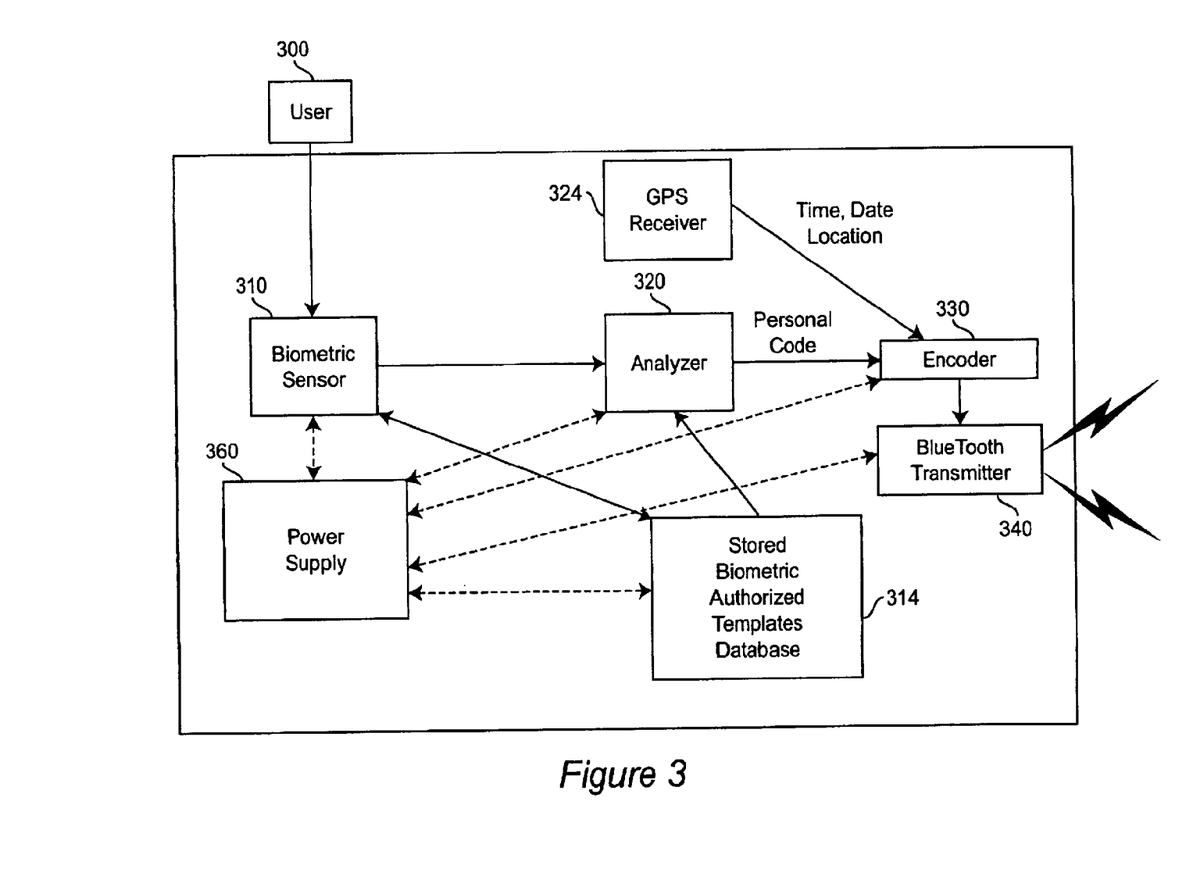
FIG. 3 is a block diagram showing an enhanced personal biometric key transmission subsystem.

FIG. 3 presents an enhanced PBK transmission subsystem. In this case, a GPS receiver is contained at 324 to provide time, date, and location information to the encoder at 330. The Bluetooth transmitter includes this information in its broadcast from 340. Otherwise, the subsystem functions as described in FIG. 1.

Figure 4:
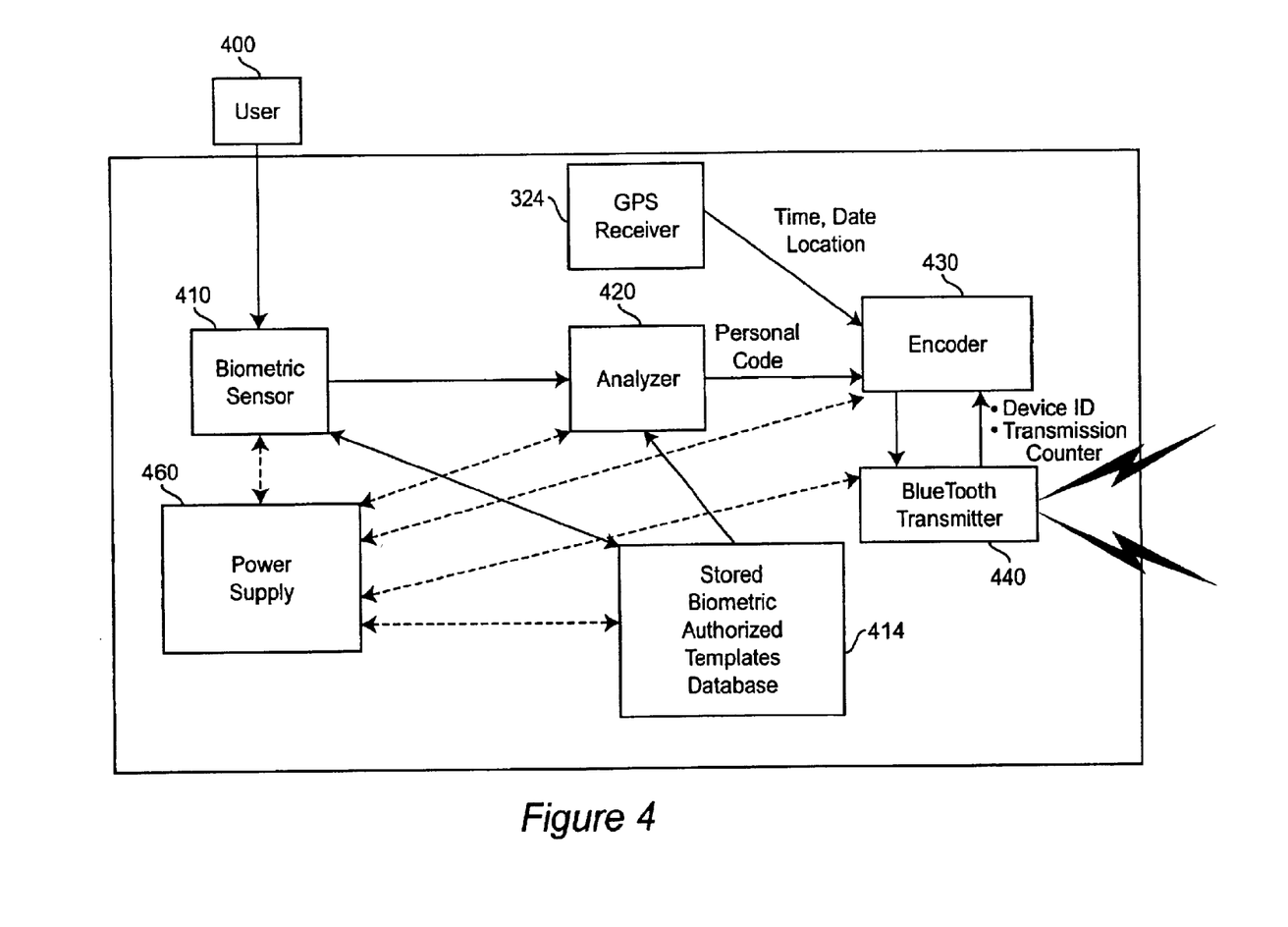
FIG. 4 is a block diagram showing a further enhancement in which the device ID and transmission counter are also encoded for transmission.

FIG. 4 presents a further enhancement in which the device ID and transmission counter are also encoded into the information which is then transmitted from 440. Bluetooth radios always have device codes which are transmitted. However, in FIGS. 1 and 3, that information is not combined into the PBK encoding information.

Figure 5:
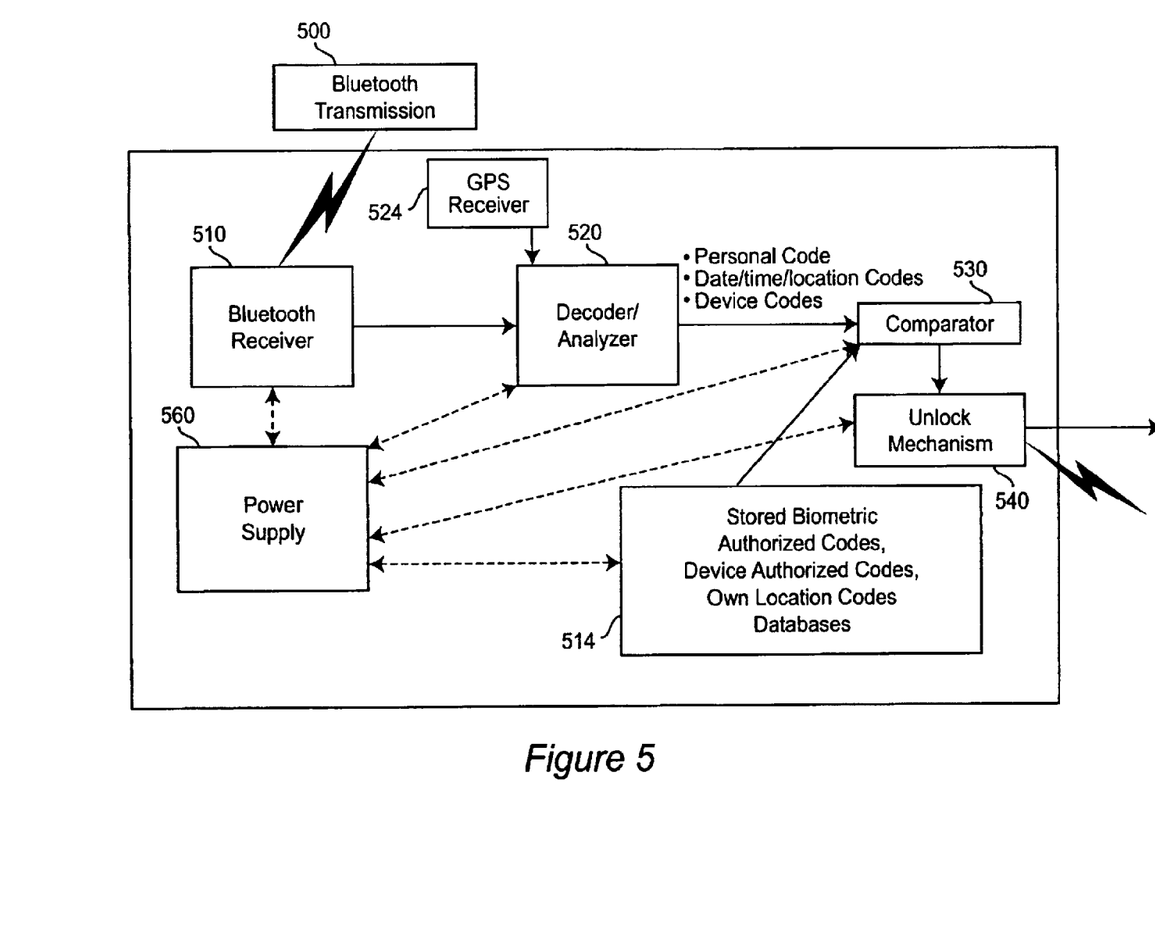
FIG. 5 is a block diagram of an enhanced biometric lock subsystem.

FIG. 5 presents the receiver subsystem for the enhanced transmitter systems. In this case, the receiver subsystem also includes a GPS receiver which provides date/time/location information. This embodiment satisfies the need for mobile and high security applications. The comparator at 530 confirms the biometric code and also the compares the location and timing of the transmission and the current status of the receiver. Based on the analysis of 520 and the results of the comparator 530, a signal is sent to the unlock mechanism 540 to either unlock or not unlock the controlled device. The control signal may be sent via hardwire, phoneline, RF, or other means.

Figure 6:
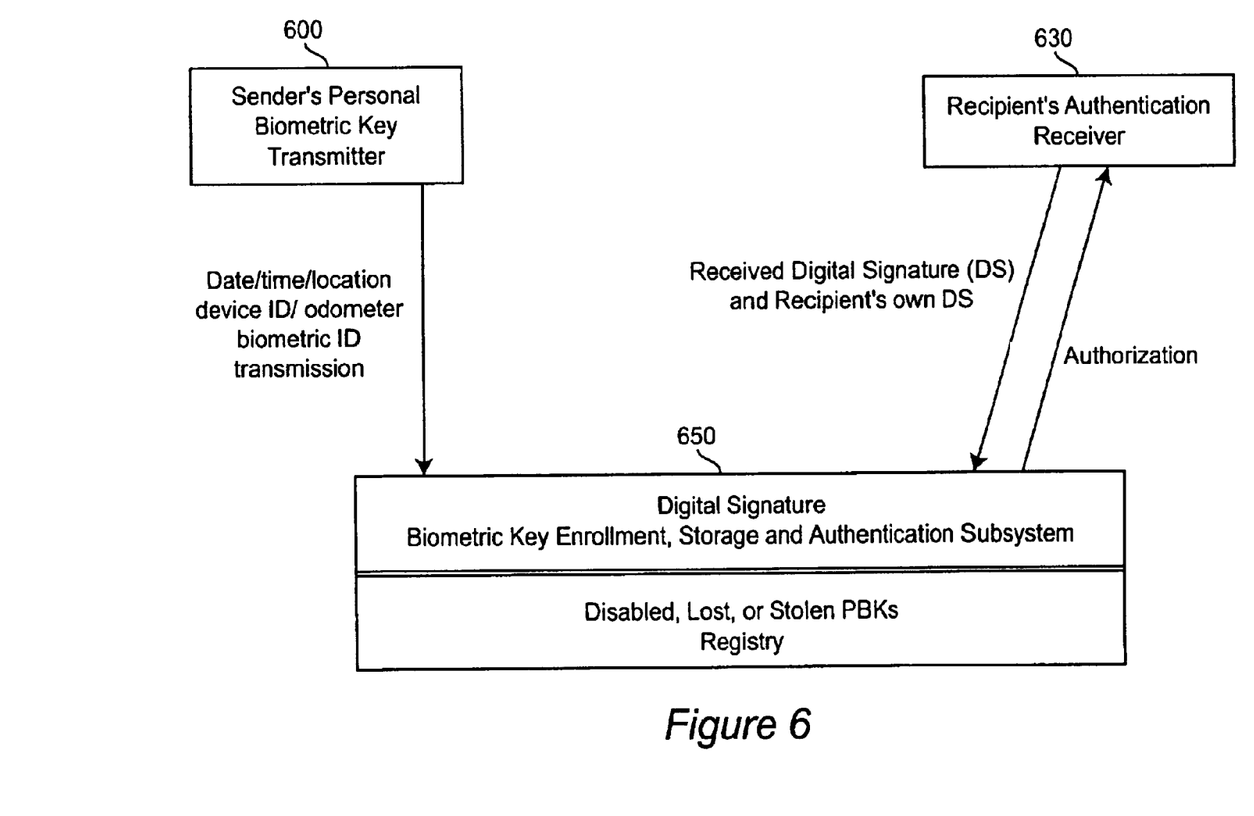
FIG. 6 is a schematic diagram showing operation of the remote key bank repository and authentication subsystem.

FIG. 6 represents the central authority and database. The sender 600 transmits biometric code, date/time/location, device ID to the central authority along with, if desired, specific instruction codes. For example, remove this ID from this device, or authenticate this ID for this device. Enrollment of an individual into a given PBK system can utilize the Central Authority 650 also for providing a duplicate at the Central Authority 650 for digital signature authentication purposes. Whenever a user updates his personal biometric code (if, for example he is using facial recognition and grows a beard), a replica may be stored in the Central Authority 650. When a PBK is lost or stolen or is to be destroyed, the Central Authority 650 is notified to delete the biometric signature, and maintains this information in a registry.

Recipients of a personal biometric code which wish to do so may check the authenticity by transmitting it to the Central Authority 650. The transmission encodes the original sender's code with their own. The recipients' own code must also be enrolled at the Central Authority 650. The Central Authority 650 confirms the authenticity of both the sender and recipient's codes and sends authorization back to the recipient. Or, if the codes cannot be verified, it sends that signal.

PBK Applications to Specific Market Segments

When installed in a cell phone or cell phone+PDA, the PBK system offers upgraded capabilities to existing use of wireless services including the following:

Emergency Users: Currently, cell phones allow manual dialing of 911 voice; with a PBK upgrade there is also enabled transmission of a pre-recorded Automatic Personal Message, along with the Date/Time/Location and biometric ID of the user. Persons with particular health conditions can transmit emergency information with minimal effort but complete security.

Convenience Users: Currently, cell phone and PDAs and modem-equipped laptops are used to make mobile phone calls, access personal databases, calendars, address/phone books, voice mail/email, stock tracking, financial transactions, purchases, internet information access including travel directions; with a PBK upgrade users are also able to deny use of device to unauthorized persons; and the devices are able to provide transaction security, legally accepted digital signatures, and elimination of passwords.

Kids: Currently, cell phones and pagers are used primarily for: link to home, parents, friends, voice mail; with a PBK upgrade there is added video images, positive ID of user, Date/Time/Location stamp on all transmissions.

Business and government users: currently, mobile cell phone and PDAs provide: voice mail, email, conference calling, paging, access to personal databases: calendar, address book, maps; access to company network and databases, order placement, report generation, authorizations verbal and written, financial transactions; with a PBK upgrade business users are able to deny use by unauthorized person, positive ID is tagged to each transaction, and Date/Time/Location is tagged to each transmission, and there is enabled legally accepted digital signatures, biometric control of other Bluetooth devices, and a portable personal biometric controller.

Communications Features

While the Personal Biometric Key can utilize any type of communications, including hardware, the method of the preferred embodiment uses radio frequency which complies with the Bluetooth radio frequency standard. Frost & Sullivan predict almost 400 million Bluetooth enabled devices in use by 2006.

The competing technology is IrDA (Infrared Data Association's infrared communications standard). IrDA is a point-to-point narrow angle (transmitter and receiving sensors at no more than a 30 degree angle from each other), at distances up to one meter and speeds of 9600 to 16 Mbps. IrDa makes it easier to stay connected to your computer, network, or printer by eliminating the need for cables. It is built into most personal computers, peripherals, embedded systems and devices of all types, including virtually all portable and desktop PCs, recent cell phones, printers, handheld communicators or personal digital assistants, medical instruments, handheld scanners, digital cameras, and many pagers.

IrDA offers: 1) worldwide universal cordless connection; 2) wide range of supported hardware and software platforms; 3) backward compatibility between successive standards; 4) simple, point-and-shoot style connection; 5) non-interference with other electronics; 6) low-level security for stationary devices; 7) high data rates.

Bluetooth solves many of the same connectivity issues through radio waves rather than light. Bluetooth is a radio frequency (RF) specification for short-range, point-to-multipoint voice and data transfer. Operating in the 2.4 GHz Industrial, scientific, and medical (ISM) band, it is designed to transmit from 10 cm to 10 meters, but by increasing the transmitter power, the distance can be extended to 100 meters. Unlike IrDA, Bluetooth may also be transmitted through solid, non-metal objects.

Bluetooth is the preferred communication embodiment for this invention, and its benefits include the following:

uses frequency hop, spread spectrum, which divides the frequency band into a number of hop channels. During a connection, radio transceivers hop from one channel to another in a random fashion.

supports up to 8 devices in a piconet (two or more Bluetooth units sharing a channel)

built-in security through authentication and encryption in its baseband protocol ability to transmit through walls and briefcases immediate synchronization when devices come into range because of its Omni-directional transmission support of both isochronous (simultaneous) and asynchronous (disparate) services, providing easy integration of TCP/IP protocols for networking regulation of guidelines by governments worldwide, which guarantees freedom from other interfering signals.

While the invention has been described in terms of preferred embodiments, those skilled in the art will recognize that the invention can be practiced with modification within the spirit and scope of the appended claims.

Having thus described my invention, what we claim as new and desire to secure by Letters Patent is as follows:

1. A personal biometric key for a user, comprising:

a biometric sensor selectable and maintainable by the user for access to one or more portals;

a source of a unique output code;

a sensor processor which produces a personal biometric code from the biometric sensor;

a composite processor which produces a composite code from the biometric code and the unique output code;

a transmitter which broadcasts the composite code to a compatible receiver at any one of said one or more portals, said receiver having a universal biometric lock to which the user has enrolled for access to said one of said one or more portals, wherein the unique output code is different for each broadcast and the universal biometric lock uses the composite code to confirm access of the enrolled user to the respective one of said one or more portals, and wherein said user can change said biometric sensor and re-enroll to any of said one or more portals in conformity with said universal biometric lock as adapted at the respective one of said one or more portals.

2. A personal biometric key of claim 1, wherein the biometric sensor is a dual-band infrared-visual camera, said infrared band providing continuous condition monitoring of the user.

3. A personal biometric key of claim 1, wherein the biometric sensor is a fingerprint scanner.

4. A personal biometric key of claim 1, wherein the biometric sensor is an iris/retinal scanner.

5. A personal biometric key of claim 1, wherein the transmitter is Bluetooth compatible.

6. A personal biometric key of claim 1, wherein said source is a clock.

7. A personal biometric key of claim 1, wherein said source is a GPS receiver.

8. A personal biometric key of claim 1, wherein said biometric sensor continuously determines a condition of the user.

9. A personal biometric key of claim 1, wherein said key is integrated into a cell phone.

10. A personal biometric key of claim 1, wherein said key in integrated into a personal digital assistant.

11. A system for user based security, comprising:

personal biometric keys having biometric sensors selectable and maintainable by users for access to a plurality of portals;

universal biometric electronic locks, said locks being adaptable to each of said plurality of portals, such that a personal biometric key for a user is operable for any of said plurality of portals selected by said user;

means in the personal biometric key for encoding an output of the selected biometric sensor for transmission to said universal biometric electronic lock, wherein said user enrolls a personal biometric key having a selected biometric sensor in each respective adapted universal biometric locks for access to each of a corresponding plurality of selected portals, and wherein said user can change said biometric sensor and re-enroll to any of said selected portals in conformity with said universal biometric lock as adapted at the respective selected portals.

12. A system as in claim 11, wherein said encoding means encodes an output of said selected biometric sensor with a unique code, said unique code being different for each transmission to said universal biometric electronic lock.

13. A system as in claim 12, wherein said transmission is Bluetooth compatible.

14. A system as in claim 13, wherein said unique code is generated by a GPS receiver.

15. A system as in claim 14, wherein for at least one user the selected biometric sensor is a dual-band infrared-visual camera, said infrared band providing continuous condition monitoring of the user.

16. A system as in claim 14, wherein for at least one user the selected biometric sensor is a fingerprint scanner.

17. A system as in claim 14, wherein for at least one user the selected biometric sensor is an iris/retinal scanner.

18. A user based method for providing security to a plurality of portals, comprising the steps of:

selecting by a user of a biometric sensor maintainable by the user for access to a plurality of portals;

generating a unique output code;

processing a personal biometric code from the selected biometric sensor;

encoding a composite code from the biometric code and the unique output code;

transmitting the composite code to a compatible receiver at any one of said plurality of portals, said receiver having a universal biometric lock to which the user has enrolled for access to said one of said plurality of portals, wherein the unique output code is different for each transmission and the universal biometric lock uses the composite code to confirm access of the enrolled user to the respective one of said plurality of portals, and wherein said user can change said biometric sensor and re-enroll to any one of said plurality of portals in conformity with said universal biometric lock as adapted at the respective one of said plurality of portals.

19. The method of claim 18, wherein the selected biometric sensor for at least one user is a dual-band infrared-visual camera, said infrared band providing continuous condition monitoring of the user.

20. The method of claim 19, wherein the transmission uses the Bluetooth protocol.

* * * * *